Figure 1:
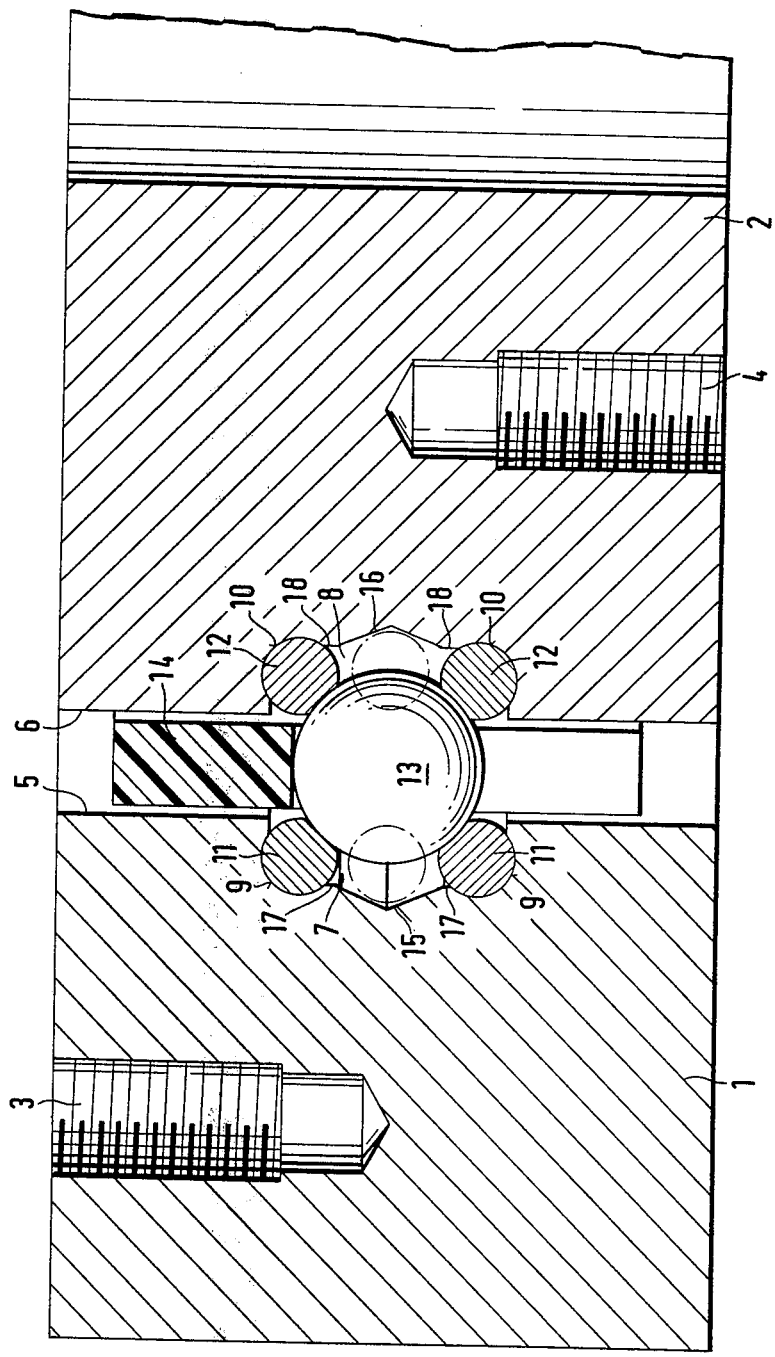

United States Patent [19]

Gugel

[11] 4,267,625

[45] May 19, 1981

[54] ASSEMBLY METHOD FOR LARGE DIAMETER ROLLING BEARINGS

[75] Inventor: Georg Gugel, Nuremberg, Fed. Rep. of Germany

[73] Assignee: Industriewerke Schaeffler OHG, Herzogenaurach, Fed. Rep. of Germany

[21] Appl. No.: 33,964

[22] Filed: Apr. 27, 1979

Related U.S. Application Data

[62] Division of Ser. No. 930,020, Aug. 1, 1978, abandoned.

[30] Foreign Application Priority Data

Aug. 2, 1977 [DE] Fed. Rep. of Germany ....... 2734712

[51] Int. Cl.³ ............................................ F16C 43/04
[52] U.S. Cl. ......................... 29/148.4 A; 29/148.4 C; 29/453
[58] Field of Search .................. 29/148.4 A, 148.4 C, 29/453

[56] References Cited

U.S. PATENT DOCUMENTS

| | | | |
|---|---|---|---|
| 2,657,105 | 10/1953 | Stearns | 29/148.4 A X |
| 2,952,900 | 9/1960 | Glavan | 29/148.4 A |
| 3,370,333 | 2/1968 | Gibson | 29/148.4 A |
| 3,482,892 | 12/1969 | Schluter et al. | 308/227 |

*Primary Examiner*—Paul A. Bell
*Assistant Examiner*—K. J. Ramsey
*Attorney, Agent, or Firm*—Hammond & Littell, Weissenberger and Muserlian

[57] ABSTRACT

A method for the assembly of large diameter rolling bearings comprising two support rings concentrically arranged one in the other, the said rings being provided with circumferential grooves, two raceways wires form-lockingly arranged in seats in the grooves under preload and rolling bodies rolling therein, at least one support ring being provided with a circular cavity in the circumferential groove which cavity is dimensioned to receive a raceway wire without preload.

4 Claims, 2 Drawing Figures

ASSEMBLY METHOD FOR LARGE DIAMETER ROLLING BEARINGS

PRIOR APPLICATION

This application is a division of my copending, commonly assigned U.S. patent application Ser. No. 930,020 filed Aug. 1, 1978, now abandoned.

STATE OF THE ART

Large diameter rolling bearings are known in which steel raceway wires may be inserted into support rings made of light metal to reduce the weight of the bearing and it is known to contact the raceway wires with the support ring under tension or prestress by shrinking, for example, to produce sturdy units consisting of the support rings and raceway wires. The raceway wires may be machined to increase the operating precision after their firm contact with the support rings to obtain very high precision in the area of the rolling body track.

OBJECTS OF THE INVENTION

It is an object of the invention to provide large diameter rolling bearings in which raceway wires are firmly secured to support rings without difficulty and without added expense.

This and other objects and advantages of the invention will become obvious from the following detailed description.

THE INVENTION

The novel large diameter rolling bearings of the invention are comprised of two support rings concentrically arranged one in the other, the said rings being provided at their outer surfaces facing each other with circumferential grooves, two raceway wires form-lockingly arranged in seats in the grooves under preload and rolling bodies rolling therein, at least one support ring being provided with a circular cavity in the circumferential groove which cavity is dimensioned to receive a raceway wire without preload.

The method of the invention for the assembly of large diameter rolling bearings comprised of two concentric supporting rings provided at their outer surfaces facing each other with circumferential grooves having 2 raceway wire seats each arranged an axial distance from each other for receiving raceway wires and provided with a circumferential cavity between the seats with a greater radial depth than the seats comprises inserting raceway wires into the circumferential cavity with their ends abutting with radical play and pressing the race wire with axial pressure into their seats where they are retained under preload.

To obtain a firm connection between at least the inner support ring and the raceway wires, it is necessary to weld raceway wires at their joint and the cavity disposed between the seats in the grooves for the raceway wires permits the insertion of a race wire, bent around but still open at its joint, into the cavity and the welding of the joint there. Then, the welded raceway wire can be moved into its seat in the groove by axial displacement.

Welding of the raceway wires in the area of the outer support ring is not absolutely necessary since they are under compressive stress during operation. To introduce open, unwelded raceway wires snugly into the seats of the groove of the outer support ring under tension, it is advisable to also provide a circumferential cavity between the seats of the raceway wires. The raceway wire can be placed in the cavity with its ends abutting without preload and then the raceway wire may be axially displaced into its seat in the groove of the support ring to provide the required preload.

As a modification of the bearings of the invention, collars may be provided at the transition from the cavity to the seats to delimit the seats axially and whose height may be dimensioned so that the raceway wires can be moved under preload across the collars into their seats. These collars give the wires an unambiguous position in their seats so that they cannot shift or otherwise change their position even during a subsequent machining process. The height of these collars should be kept extremely low because they need not absorb any forces any more in the later operation of the rolling bearing. It is therefore easily possible to dimension their height so that the race wires can be moved across them into the seats under preload without harmful permanent deformation.

Another modification of the invention consists in that the cavity between the two seats for the raceway wires has a radial extent great enough that a race wire welded outside the support ring can be introduced into the depression under slight elastic deformation. It thus becomes possible to weld the raceway wires outside the support rings and thereafter to subject them to the necessary heat treatment. By heat treatment after welding, any embrittlement of the material at the weld is eliminated and hence the danger of cracks in the weld seam are ruled out. Bringing the raceway wire into the cavity is done in a known manner by first introducing it into the cavity at one point of the circumference and then moving it into the cavity across the support ring edge about the rest of the circumference with eccentric displacement. Thereafter, the raceway wire is moved by axial displacement into its seat within the groove.

Figure 2:
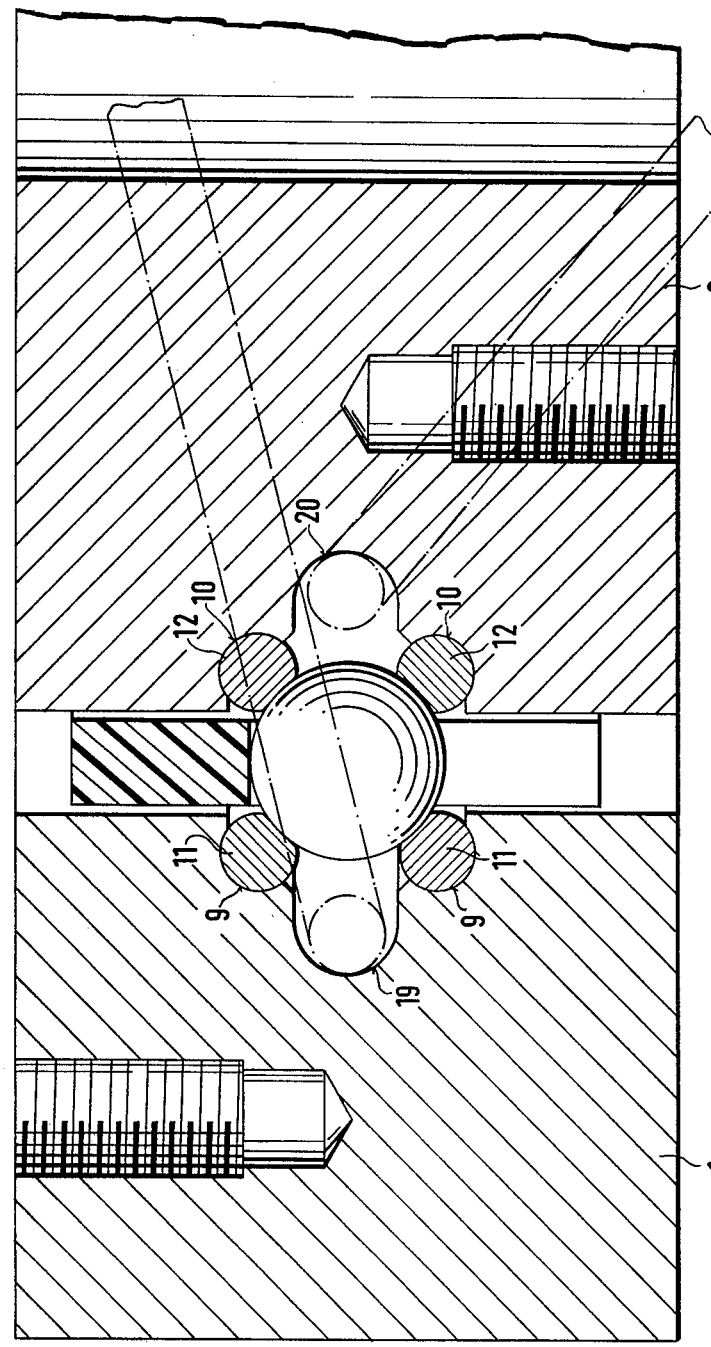

Referring now to the drawings:

FIG. 1 is a partial longitudinal cross-section through one embodiment of a bearing of the invention, and FIG. 2 is a partial longitudinal cross-section through a second embodiment of a bearing of the invention.

The rolling bearing illustrated in FIG. 1 consists of outer support ring 1 and inner support ring 2, which are provided with threaded bores 3 and 4, respectively, for their attachment. At their mutually facing surfaces 5 and 6, respectively the support rings are provided with circumferential grooves 7 and 8 and these grooves have seats 9 and 10 in which the raceway wires 11 and 12 are form-lockingly received. Balls 13 roll on these raceway wires and the balls are guided in a cage 14.

Between the raceway wires 11 on the one hand and 12 on the other, or respectively between their seats 9 and 10, there are provided in grooves 7 and 8 circling cavities 15 and 16 which are dimensioned so that, as shown in dash-dot lines, they can receive a raceway wire 11 or 12 without preload. Between these cavities and the seats for the raceway wires, collars 17 and 18 are provided which axially delimit the seats and which are dimensioned so that the raceway wires can be brought into the seats across them under preload.

Insertion of the raceway wires into their seats in the support rings can be effected according to the invention as follows. At inner ring 2 which is provided with machined finished groove 8 containing seat 10 for the raceway wires and cavity 17, a raceway wire cut to the exact length and open at its joint is introduced so that it lies in the area of cavity 16. In this position, the raceway wire is welded at its joint and then the raceway wire is pressed into its seat 10 over the collar 18 under elastic expansion. The mounting of the second race ring then is effected in the same manner.

Insertion of raceway wires 11 into outer support ring 1 can be effected basically in the same manner. As the raceway wires in the outer support rings are under compressive stress during operation, it is not absolutely necessary to weld these to the support rings at their joint. Rather, it is possible to insert a raceway wire 11 first into the area of cavity 15 so that its end faces abut in the area of its joint. Then, the raceway can be brought from the area of cavity 15 over collar 17 into seat 9. The second raceway wire 11 can be introduced into outer support ring 1 in the same manner. Then, balls 13 can be introduced into the space between the outer and inner support rings in a known manner by offsetting them eccentrically relative to each other. Thereafter, the balls 13 are distributed uniformly over the bearing circumference and are held in their proper spacing by introducing the cage 14.

The modification shown in FIG. 2 differs from the design in FIG. 1 only in that between seats 9 and 10 for the raceway wires 11 and 12 cavities 19 and 20 are provided, the radial extent of which is taken large enough that raceway wires 11 and 12, completely prepared and welded outside the support rings, can be introduced into these cavities under slight elastic deformation. The dash-dot lines indicate the positions of the raceway wires which they occupy during insertion into the depressions.

Various modifications of the bearings of the invention may be made without departing from the spirit or scope thereof and it should be understood that the invention is intended to be limited only as defined in the appended claims.

I claim:

1. A method for the assembly of large diameter rolling bearings comprised of two concentric supporting rings provided at their outer surfaces facing each other with circumferential grooves having 2 raceway wire seats each arranged in axial distance from each other for receiving raceway wires and provided with a circumferential cavity between the seats with a greater radial depth than the seats comprising inserting raceway wires into the circumferential cavity with their ends abutting with radial play and pressing the raceway wires with axial pressure into their seats where they are retained under preload with their ends abutting.

2. The method of claim 1 wherein the raceway wires bear on their abutting ends with pressure as the only connecting means.

3. A method for the assembly of large diameter rolling bearings comprised of two concentric supporting rings provided at their outer surfaces facing each other with circumferential grooves having 2 raceway wire seats each arranged an axial distance from each other for receiving raceway wires and provided with a circumferential cavity between the seats with a greater radial depth than the seats comprising inserting raceway wires into the circumferential cavity with their ends abutting with radial play and pressing the raceway wires with axial pressure into their seats where they are retained under preload and the raceway wires are welded at their abutting ends.

4. The method of claim 3 wherein the abutting ends of the raceway wires are welded outside the support rings and are elastically deformed for insertion into the raceway wire seat.

* * * * *